United States Patent [19]
Poncet

[11] 4,348,248
[45] Sep. 7, 1982

[54] PREPARATION OF DE-GASSED COMPLEX PRODUCTS FORMED OF FIBRES IMPREGNATED WITH A PLASTIC MATERIAL

[76] Inventor: Pierre Poncet, 12bis Rue Trarieux, 69003 Lyons, France

[21] Appl. No.: 192,162

[22] Filed: Sep. 29, 1980

[30] Foreign Application Priority Data

Oct. 2, 1979 [FR] France ............................... 79 25022

[51] Int. Cl.³ ............................................. B32B 31/00
[52] U.S. Cl. ............................. 156/276; 156/62.4; 156/324; 427/324; 427/299; 427/345; 427/350; 427/421
[58] Field of Search ...................... 264/102, 128, 115; 156/62.4, 62.2, 276, 324, 286, 296; 427/421, 345, 424, 350, 299, 325, 324; 65/4.4

[56] References Cited

U.S. PATENT DOCUMENTS

| | | | |
|---|---|---|---|
| 2,331,146 | 10/1943 | Slayter | 156/62.4 |
| 2,903,389 | 9/1959 | Fujita | |
| 3,229,445 | 1/1966 | Kraft | 264/102 X |
| 3,621,892 | 11/1971 | Gillespie | 264/102 |
| 3,629,028 | 12/1971 | McLarty et al. | 156/196 X |
| 3,734,814 | 5/1973 | Davis et al. | 156/324 |
| 4,141,929 | 2/1979 | Stoops et al. | 260/862 |
| 4,187,327 | 2/1980 | Lapp et al. | 427/345 |

FOREIGN PATENT DOCUMENTS 1330854 5/1963 France .
2164688 3/1973 France .

Primary Examiner—Shrive P. Beck
Attorney, Agent, or Firm—Dowell & Dowell

[57] ABSTRACT

A fibrous web carried by a thin film disposed on a conveyor passes under a number of spray tubes which pour thereon a plastic material in liquid form which has been de-gassed under vacuum in a gas eliminating apparatus. The liquid absorbs gases from the fibres and overflows laterally into a lower trough from which it is recycled into the gas eliminating apparatus. The web is thus progressively de-gassed and impregnated with de-gassed plastic material. It is then covered by another thin film to form a sandwiched complex product for further operations.

3 Claims, 6 Drawing Figures

PREPARATION OF DE-GASSED COMPLEX PRODUCTS FORMED OF FIBRES IMPREGNATED WITH A PLASTIC MATERIAL

The present invention relates to the preparation of a complex product formed of fibres, as for instance glass fibres, impregnated with an appropriate plastic material, preferably of the thermosetting type.

A problem in the technique of forming reinforced plastics is that the material should be as far as possible free from any gas since even microscopic gas bubbles may form the starting point of cracks in the finished parts. Gases should therefore be carefully eliminated from the initial plastic material and from the other substances which may be mixed with it. This elimination or "de-gassing" is generally obtained by submitting the impregnating material in the form of a finely divided solid, or preferably of a liquid to a vacuum. This involves a number of successive operations which increase noticeably the cost of the finished products.

It is an object of this invention to provide a method and a machine for the preparation of a de-gassed complex product formed of fibres impregnated with a plastic material, which will avoid this disadvantage of the prior art.

Another object of the present invention is to provide a method and a machine which will prepare such a complex product in a continuous manner, in the form of an endless band.

In accordance with the invention the plastic material under liquid form is de-gassed and is caused to flow on the fibres, the overflowing liquid being recycled into the gas eliminating apparatus. The fibres may be in the form of a continuously moving web, the de-gassed liquid plastic material being applied to this web by means of spray tubes or the like.

In the annexed drawings:

FIG. 1 diagrammatically illustrates a first embodiment of a machine according to the invention.

Figure 1:
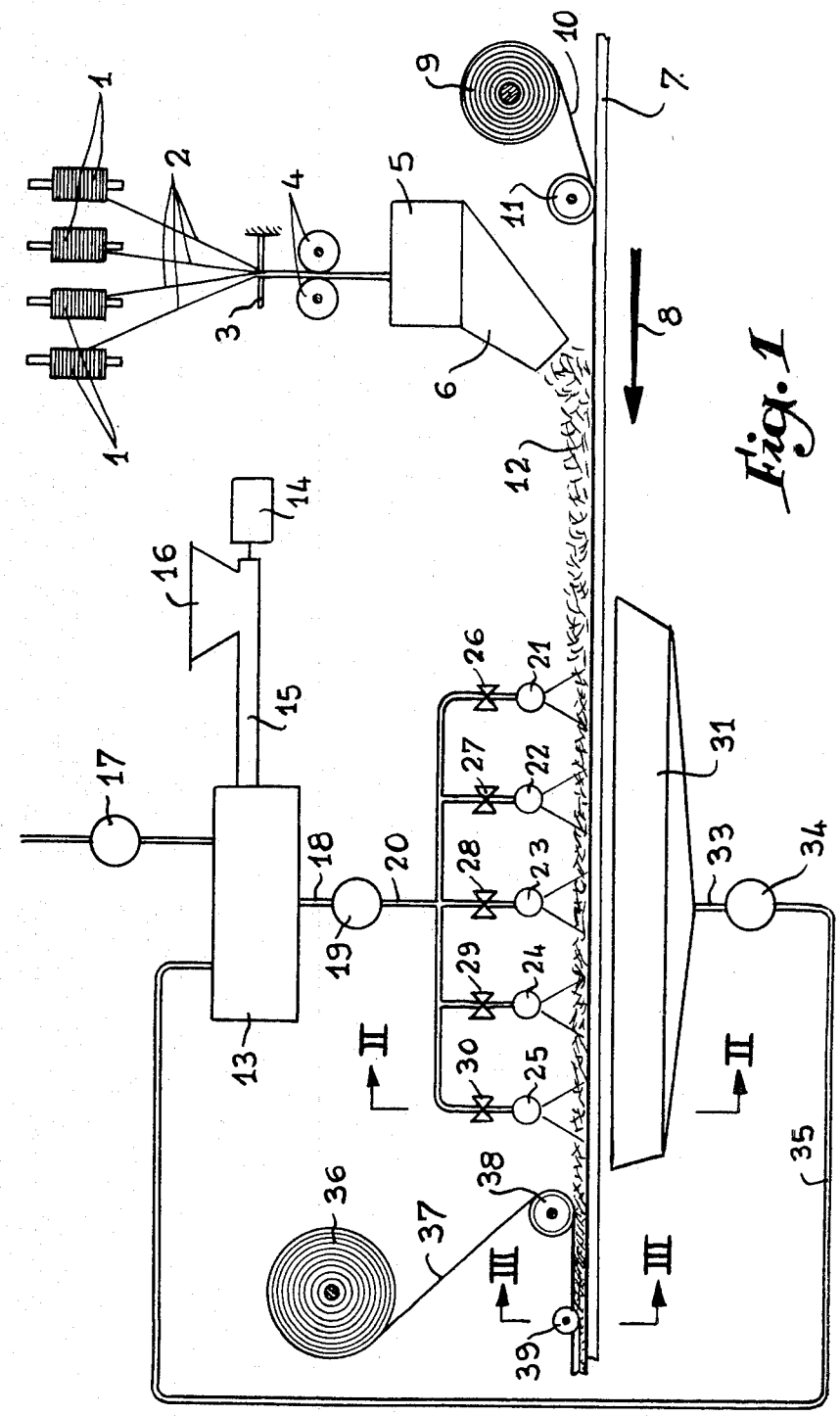

In FIG. 1 reference numeral 1 designates bobbins from which are drawn glass filaments 1 which pass through a comb 3 and between drawing rollers 4 by means of which they are fed to a chopper 5 which thus produces glass fibres of substantially uniform length. These fibres are directed through a chute 6 towards an endless band conveyor 7 which moves towards the left (arrow 8). There is besides provided upstream of chute 6 a spool 9 from which is unwound a thin film 10 of an appropriate material, as for instance polyethene, which is applied on conveyor 7 by a pressing roller 11. With such an arrangement the fibres issuing from chute 6 form on the film 10 a substantially uniform layer or web 12.

The machine further comprises a gas eliminating apparatus 13 which operates under vacuum and comprises agitating members, such as intermeshing screws (not illustrated) driven by a motor 14. This apparatus includes a gas-tight inlet device 15 provided with a hopper 16 and through which plastic material in liquid or semi-liquid form may be introduced into the said apparatus. The plastic material thus used is preferably of the thermosetting type. Reference numeral 17 designates the pump associated with apparatus 13.

The outlet 18 of apparatus 13 is connected through a pump 19 and a conduit 20 with five spray tubes 21, 22, 23, 24 and 25 disposed in succession transversely above conveyor 7 downstream of chute 6. In operation the plastic material from apparatus 13, which in therefore free from any gas, is thus regularly sprayed on the layer or web 12, the flow rate of these spray tubes being adjustable by means of individual valves 26, 27, 28, 29 and 30.

Figure 2:
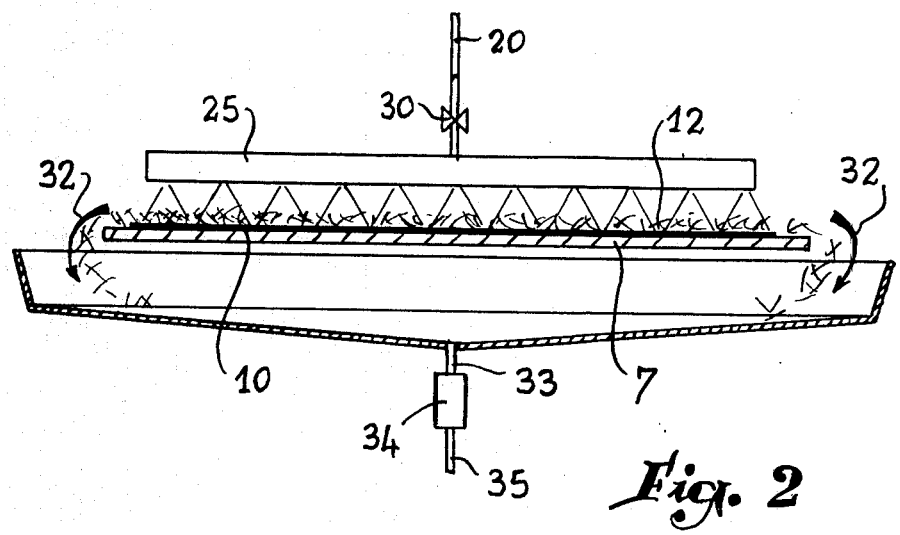
FIGS. 2 and 3 are fragmental cross-sections respectively corresponding to lines II—II and III—III of FIG. 1.

A collecting trough 31 is disposed below the region of conveyor 7 which corresponds to spray tubes 21-25, this trough being slightly wider than the conveyor (see FIG. 2). It will be understood that the liquid plastic material sprayed on web 12 overflows laterally and is received by trough 31 (see arrows 32).

Trough 31 has a lower outlet 33 connected with a pump 34 which re-cycles the liquid into the gas eliminating apparatus 13 through a conduit 35.

A second thin film 37 is drawn from a spool 36 situated downstream of spray tubes 21-25 and it is applied by a roller 38 onto the layer or web 12 now impregnated with liquid plastic material. This web is thus maintained between two flexible walls in the form of an endless sandwiched unit which may be directed towards other appropriate machines, including an oven to polymerize the plastic material.

Figure 3:
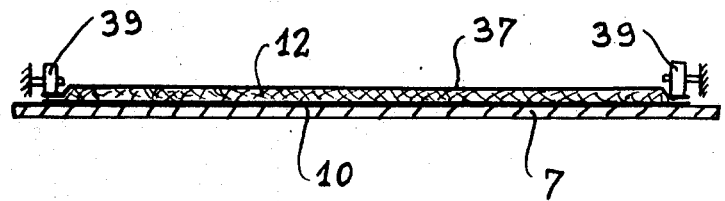

In order to avoid the possibility that downstream of roller 38 the still liquified impregnating material may leak laterally, the edges of film 10 and 37 are preferably pressed against each other by lateral rollers 39 (see also FIG. 3).

It will be understood that the liquid which flows down through the fibrous layer 12 absorbs the gases retained by the fibres. Owing to the successive arrangement of spray tubes 21-25 and to the continuous recycling of the overflowing liquid, the web is so to speak progressively washed, and when it reaches roller 38 it may be considered that the gases have been practically eliminated from the fibres and also from the impregnating liquid itself. The complex unit comprising the glass fibres and thermoplastic liquid therefore contains no gas bubbles.

Of course the web and the impregnating liquid are more or less exposed to ambient atmosphere upstream of roller 38 and they may absorb a small quantity of air, but experience demonstrates that this quantity is negligible.

Figure 4:
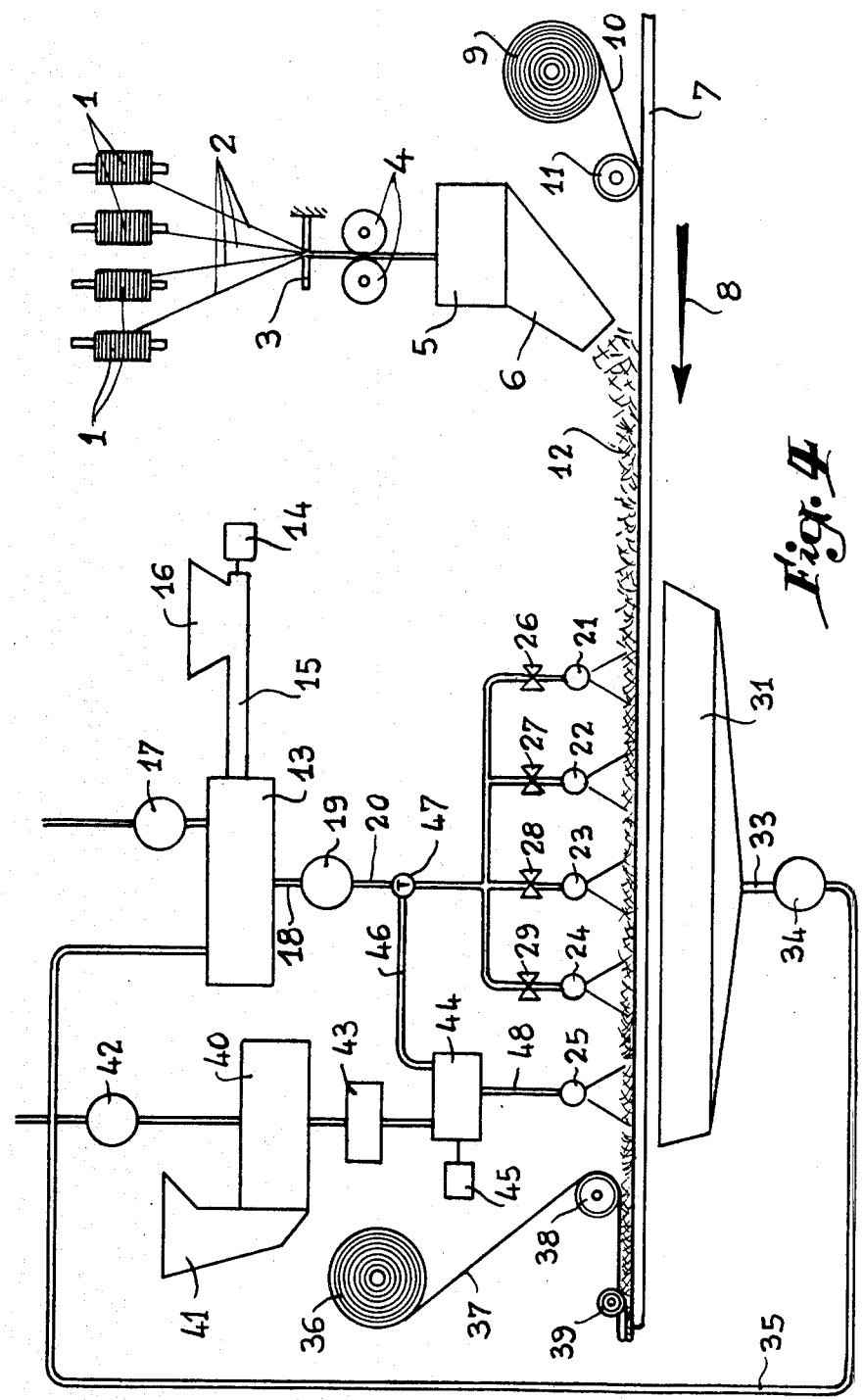
FIG. 4 is a view similar to FIG. 1 but showing another embodiment wherein powders are mixed with the plastic material.

In the embodiment of FIG. 4 an appropriate powder is mixed with the plastic material for any purpose, as for instance as a pigment. The machine here comprises an auxiliary gas eliminating apparatus 40 which receives the powder through a hopper 41 (provided with appropriate air lock means to avoid air inlet), a vacuum pump 42 being associated with this apparatus 40. The treated powder issuing from this apparatus (here again through an appropriate air lock) passes through a cooler 43 and reaches a mixer 44, for instance of the intermeshing screw type, which receives through a branch conduit 46 and a three-way valve 47 a fraction of the liquid thermosetting material forced by pump 19. The mixture from mixer 44 is fed through a conduit 48 to the fifth and last spray tube 25.

The web 12 is thus finally impregnated with a mixture of plastic material and of powder which contains practically no absorbed gas. Tests have demonstrated that this separate treatment of the powder is an advantage.

The collecting trough 31 may be arranged, if desired, so as not to collect any overflowing liquid from spray tube 25 in order to avoid the presence of abrasive powder particles in the main gas eliminating apparatus 13, but experience shows that this is not important.

Figure 5:
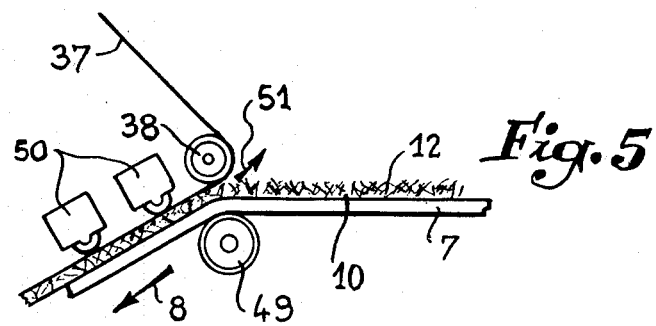
FIG. 5 shows a modification of the machine according to FIG. 1 or to FIG. 4.

Of course in the machine of FIGS. 1 and 4 no air bubble should be caught between the impregnated layer or web 12 and the covering film 37. This is normally achieved by arranging roller 38 in such manner that it squeezes web 12 to a limited extent. FIG. 5 illustrates a modification wherein this elimination of air bubbles is realized by causing conveyor 7 to pass over a roller 49 which deviates it downwardly and by providing downstream of this roller a number of vibrators 50. Any air bubble thus tends to run upwardly between the web 12 and the covering film 37, and to escape below roller 38 which is only mederately applied against the web.

Figure 6:
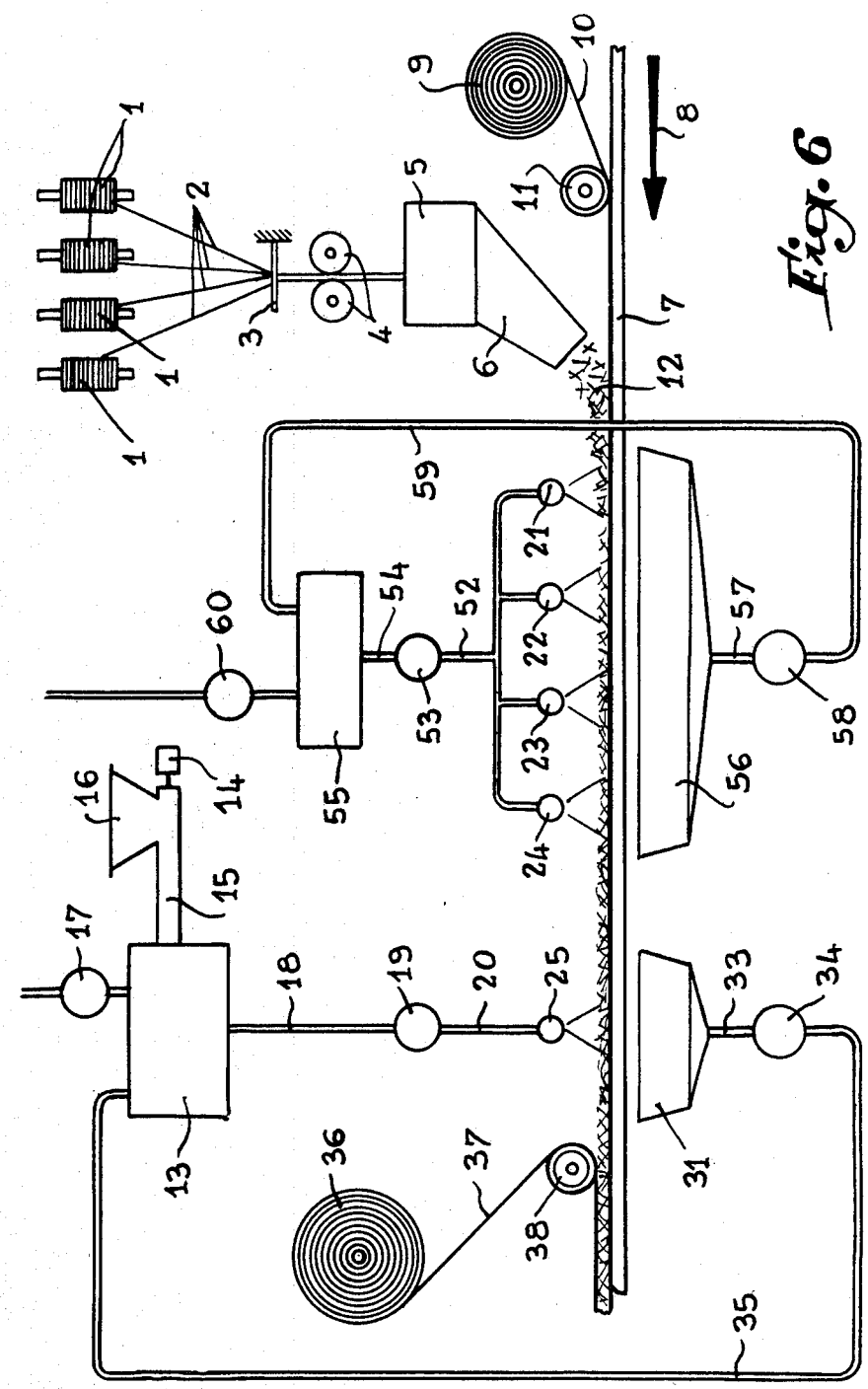
FIG. 6 illustrates a third embodiment using an auxiliary gas absorbing liquid.

FIG. 6 illustrates a machine wherein a separate liquid is used for the elimination of the gases absorbed by the glass fibres. The main gas eliminating apparatus 13 only feeds the last spray tube 25 and the length of the collecting trough 31 is reduced in accordance. As to the preceding spray tubes 21, 22, 23 and 24 they receive an auxiliary gas absorbing liquid through a conduit 52, a valve 53 and another conduit 54, from a separate gas eliminating apparatus 55 equiped with a vacuum pump 60. The auxiliary liquid which overflows laterally from web 12 is collected by a separate trough 56 from which it is directed by a conduit 57 towards a pump 58, the latter recycling it into apparatus 55 through a conduit 59.

The auxiliary liquid may be selected in such manner that it penetrates perfectly the fibrous web. Of course a small quantity of this liquid is retained by the fibres and becomes mixed with the thermosetting material issuing from the last spray tube 25. It should therefore be such that it is dissolved by this material or otherwise incorporated thereto without any detrimental effect upon the finished product.

While it has been assumed that the impregnating material was of the thermosetting type, it should be understood that the invention may also be applied in the case of thermoplastic materials, provided the machine is maintained at an appropriate temperature, cooler 42 then being omitted in the embodiment of FIG. 4.

I claim:

1. In a method for preparation of a de-gassed complex product formed of fibers impregnated with a plastic material, made by creating an endless flat web and conveying it substantially horizontally while passing said web continuously below successive nozzle locations and pouring onto said web said plastic material in liquid state, and collecting and recycling the excess of said plastic material to said nozzle locations, the improvement which comprises:

dividing said nozzle locations into first and second nozzle groups, with said first group being disposed upstream of said second group relative to the movement of said web;

feeding the first group with an auxiliary liquid which is selected to absorb gases from the web and which has been previously fully de-gassed under vacuum, the web being penetrated and progressively washed by the auxiliary liquid to remove gases therefrom, and such auxiliary liquid as is retained by the web being compatible with and dissolved by the plastic material with which said web is to be impregnated;

collecting the excess of said auxiliary liquid which overflows laterally from said web;

fully de-gassing under vacuum said excess of said auxiliary liquid and then recycling it to the first nozzle group;

feeding the second nozzle group with a different liquid material with which said web is to be impregnated and which comprises a plastic material which has previously been fully de-gassed under vacuum;

collecting separately the excess of said plastic material which flows laterally from said web;

and fully de-gassing said collected excess of plastic material and then recycling it to the second nozzle group.

2. In a method as claimed in claim 1:

disposing a first protecting plastic film below the web and supporting said web while conveying it;

and disposing a second protecting film on said web after it has passed below the nozzle groups.

3. In a method as claimed in claim 2, pressing together the edges of said first and second films to fully enclose said impregnated web.

* * * * *